US012603014B2

(12) United States Patent
Sishtla et al.

(10) Patent No.: US 12,603,014 B2
(45) Date of Patent: Apr. 14, 2026

(54) CLOUD-BASED AREA OBSTACLE DETECTION

(71) Applicant: Rockwell Collins, Inc., Cedar Rapids, IA (US)

(72) Inventors: Venkata A. Sishtla, Cedar Rapids, IA (US); Jacob G. Teague, West Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 259 days.

(21) Appl. No.: 18/127,283

(22) Filed: Mar. 28, 2023

(65) Prior Publication Data

US 2024/0331556 A1 Oct. 3, 2024

(51) Int. Cl.
*G08G 5/80* (2025.01)
*G08G 5/26* (2025.01)
*G08G 5/76* (2025.01)

(52) U.S. Cl.
CPC ................. *G08G 5/80* (2025.01); *G08G 5/26* (2025.01); *G08G 5/76* (2025.01)

(58) Field of Classification Search
CPC .. G08G 5/80; G08G 5/26; G08G 5/76; H10D 30/0327; H10D 64/311; H10F 77/1692; G01S 2013/916; G01S 13/933; G01S 7/412
See application file for complete search history.

(56) References Cited

U.S. PATENT DOCUMENTS

| | | | | |
|---|---|---|---|---|
| 6,606,035 | B2 * | 8/2003 | Kapadia | G08G 5/727 340/972 |
| 7,417,738 | B2 * | 8/2008 | Taylor | G01B 11/22 356/614 |
| 11,402,840 | B2 | 8/2022 | Danford | |
| 12,106,675 | B2 * | 10/2024 | Foo | G08G 5/21 |
| 12,165,528 | B2 * | 12/2024 | Agyekum | G08G 5/55 |
| 2002/0093433 | A1 | 7/2002 | Kapadia et al. | |
| 2008/0252489 | A1 * | 10/2008 | Naimer | G01C 23/005 340/971 |
| 2013/0127642 | A1 * | 5/2013 | Maggiore | G08G 5/0008 340/947 |
| 2017/0249852 | A1 * | 8/2017 | Haskins | G05D 1/0676 |
| 2019/0019423 | A1 | 1/2019 | Choi et al. | |
| 2020/0108946 | A1 | 4/2020 | Harris et al. | |
| 2021/0132233 | A1 | 5/2021 | Govindillam et al. | |
| 2021/0190944 | A1 * | 6/2021 | Nohara | B64F 1/18 |
| 2022/0343094 | A1 | 10/2022 | N et al. | |

(Continued)

OTHER PUBLICATIONS

European Search Report received in EP Application No. 24166715.3, Aug. 20, 2024, 10 pages.

*Primary Examiner* — Christopher George Fees
(74) *Attorney, Agent, or Firm* — Sulter Swantz IP

(57) ABSTRACT

A system for detecting threats at an area is disclosed. The system may include a controller including one or more processors configured to execute a set of program instructions stored in a memory. The set of program instructions may be configured to cause the one or more processors to receive safe historical data of an area configured to be representative of a lack of threats, receive new data of the area from one or more nodes, compare the new data and the safe historical data to identify a difference between the new data and the safe historical data, and update a database based on the difference.

13 Claims, 5 Drawing Sheets

(56) References Cited

U.S. PATENT DOCUMENTS

| | | | | |
|---|---|---|---|---|
| 2022/0349996 | A1* | 11/2022 | Fina | G01C 21/3844 |
| 2024/0051681 | A1* | 2/2024 | Ferrier | B64D 43/00 |
| 2024/0177614 | A1* | 5/2024 | Muzzy | G07C 5/0825 |
| 2024/0386802 | A1* | 11/2024 | Zheng | G01S 13/953 |
| 2025/0232077 | A1* | 7/2025 | Yang | G08G 5/22 |

* cited by examiner

RADAR DETECTED RUNWAY MAP

CLOUD-BASED AREA OBSTACLE DETECTION

TECHNICAL FIELD

The present disclosure relates to the technical field of identifying potential threats (e.g., hazardous obstacles) in vehicle operation areas, and, in particular, to identifying threats by combining sensor data from multiple aircraft via a cloud/network infrastructure.

BACKGROUND

Threats are not always immediately identifiable by aircraft threat detection systems or a pilot. As the aerospace industry moves towards autonomous operations, it is important to accurately identify threats both on the runway and in the general airport environment to enable safe aircraft operation. Landing in fog and other bad conditions further exacerbates this issue. Higher frequency radars allow for better resolution but are susceptible to severe attenuation in the presence of rain. There is a need to accurately identify obstacles in areas such as runways while maintaining other radar functions.

SUMMARY

A system for detecting threats at an area is disclosed in accordance with one or more illustrative embodiments of the present disclosure. In one illustrative embodiment, the system may include a controller including one or more processors configured to execute a set of program instructions stored in a memory. In another illustrative embodiment, the set of program instructions may be configured to cause the one or more processors to receive safe historical data of an area configured to be representative of a lack of threats. In another illustrative embodiment, the set of program instructions may be configured to cause the one or more processors to receive new data of the area from one or more nodes. In another illustrative embodiment, the set of program instructions may be configured to cause the one or more processors to compare the new data and the safe historical data to identify a difference between the new data and the safe historical data. In another illustrative embodiment, the set of program instructions may be configured to cause the one or more processors to update an area threat database based on the difference.

A method for detecting threats at an area is disclosed in accordance with one or more illustrative embodiments of the present disclosure. In one illustrative embodiment, the method may include receiving safe historical data of an area configured to be representative of a lack of threats. In another illustrative embodiment, the method may include receiving new data of the area from one or more nodes. In another illustrative embodiment, the method may include comparing the new data and the safe historical data to identify a difference between the new data and the safe historical data. In another illustrative embodiment, the method may include updating an area threat database based on the difference.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
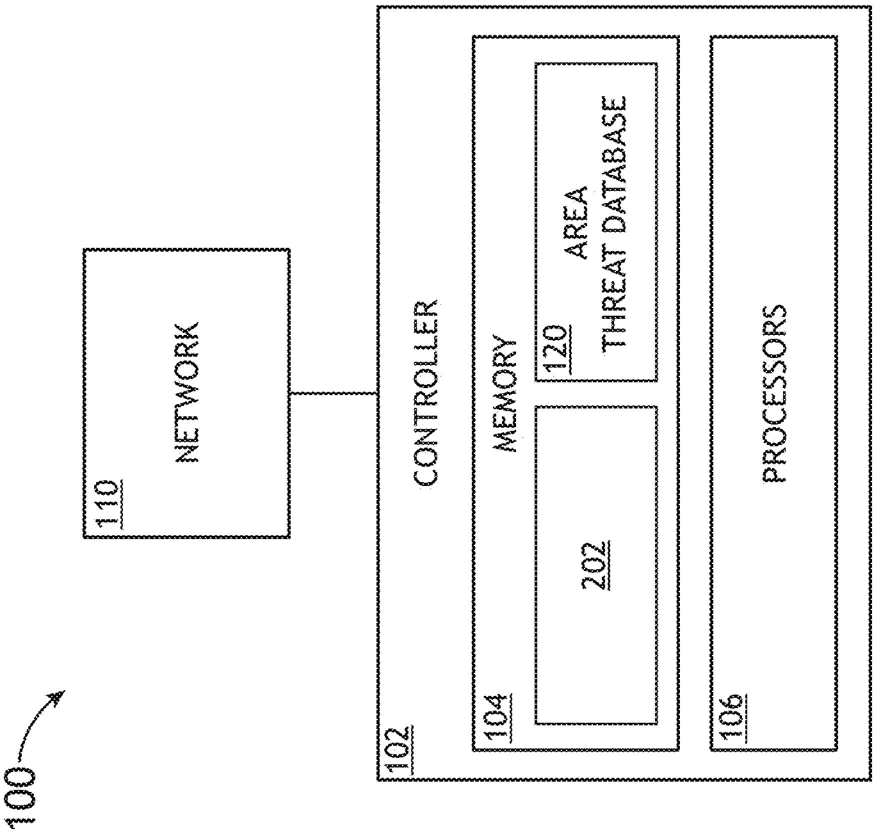
FIG. 1 is a block diagram of a system for detecting threats at an area, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, the present disclosure is directed to a system for detecting threats at an area (e.g., airport). More specifically, the present invention relates to a system that uses a controller including one or more processors to compare historical data (e.g., radar sensor data) of an area (e.g., runway, taxiways, and the like) with updated/new data from one or more aircraft of the same area, to keep track of threats (e.g., obstacles, hazards, etc.) more reliably than other methods. For example, new data from multiple aircraft may be stored on a cloud, network, and the like, and processed to allow for highly accurate identification and storage of threats (e.g., differences between the new data and historical data). The threats may be stored so that future aircraft may be alerted to the threats (e.g., via ADS-B, etc.). It is contemplated that such a system and method may allow for safer airport operations. For instance, more autonomous operations (e.g., one pilot instead of two pilots) may benefit from more robust and autonomous threat detection.

In some embodiments, the system may be configured to combine weather risk data with multiple aircraft radar data to identify differences in the radar data indicative of a threat (e.g., hard packed snow) and inform aircraft and/or air traffic control of the threat.

A crowd-sourced, cloud-based system or method may enable more robust threat detection algorithms by aggregating a wide variety of environmental scenarios during the development phase. Sharing this information (e.g., with air traffic control) can help avoid hazardous incursion events. In embodiments, this system and method may also be used for other threat identification such as terrain (e.g., identifying upcoming cliff faces through fog).

A module may be any module, such as, but not necessarily limited to, a function, application, set of lines of code, and/or the like of software (e.g., Python™ programming language, C++™ programming language, machine learning weights of a neural network, stateless software, non-stateless software, and/or the like) and/or hardware (Field Programmable Gate Array (FPGA) configured to perform operations to data, and the like).

FIG. 1 is a block diagram of a system 100 for detecting threats at an area (e.g., vehicle operation area such as an airport), in accordance with example embodiments of this disclosure. The system 100 includes a controller 102 that is configured to execute a set of program instructions stored in a memory 104 and executed on a processor 106. The controller 102 may be communicatively coupled to a network 110 to receive new data 202 of the area, but the network 110 isn't necessarily a part of the system 100. The network 110 and/or memory 104 may be used to store/update an area threat database 120 (e.g., airport threat database 120) including identified differences (e.g., difference 238 of FIG. 2C) in the new data 202.

Figure 2A:
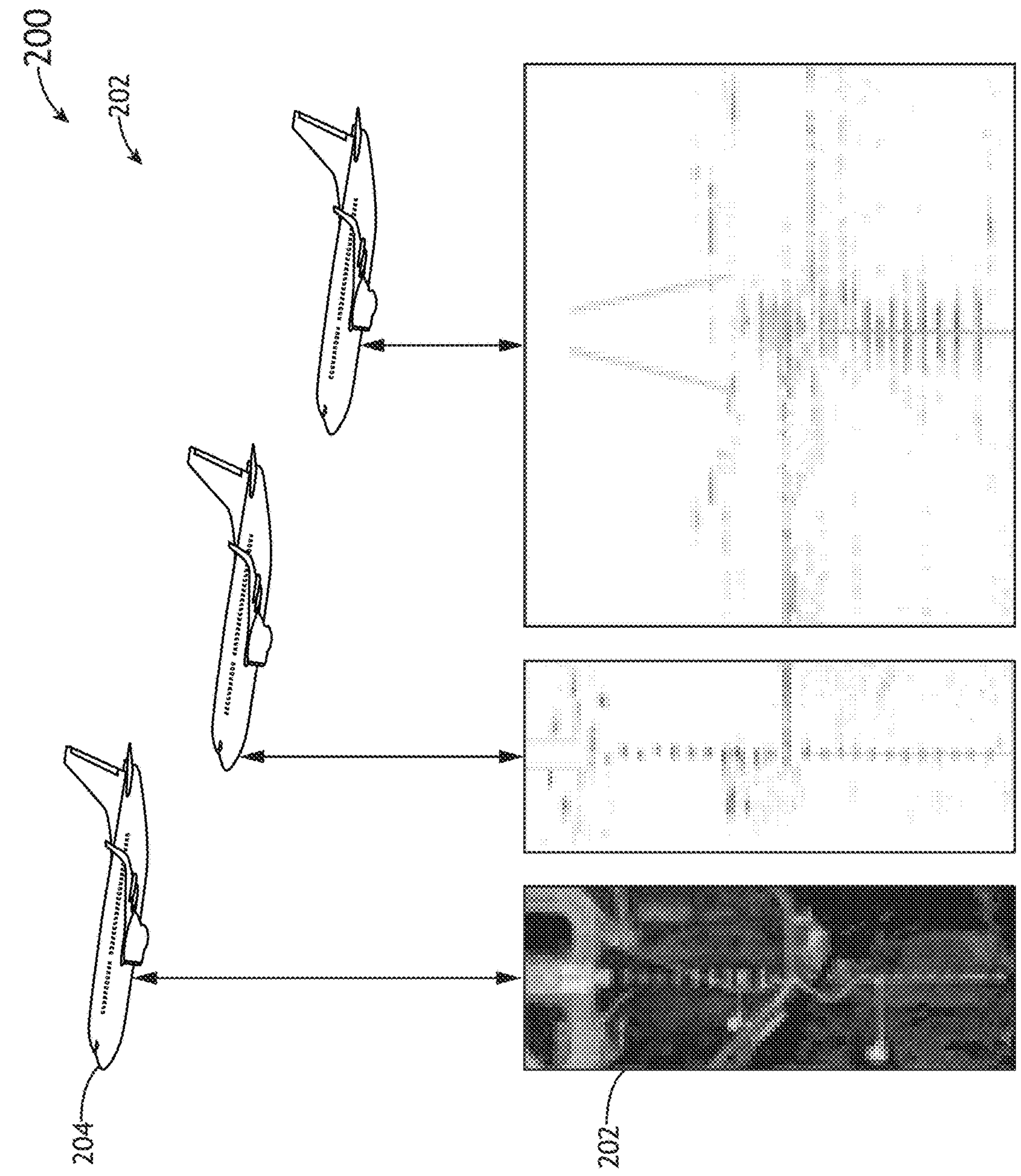
FIG. 2A is a conceptual illustration of capturing new data, in accordance with example embodiments of this disclosure.

FIG. 2A is a conceptual illustration of capturing new data 202 from one or more nodes 204, in accordance with example embodiments of this disclosure. FIG. 2A may be a part of a step 210 of a method 200 for detecting threats at an area (e.g., airport). It is noted that such a step may generally be performed on the system 100, the controller 102, and/or any other controller. For example, step 210 may be indicative of capturing new data 202 on a set of nodes 204 (e.g., aircraft 204), where each node 204 includes its own controller 102 that is configured to capture the new data 202 from a sensor. Each node 204 may be configured to transmit its own new data 202 to the controller 102 (e.g., a central controller/server on a cloud accessed through any communication protocol such as satellite communications, a networked controller/server of a particular area, and/or the like).

Note that the above examples of a node 204 (e.g., vehicle such as aircraft) are nonlimiting examples and, generally a node 204 may be any node, such as any sensor configured to detect threats. For example, a node 204 may be a ground-based sensor (e.g., ground radar, LIDAR™ (Light Detection and Ranging) technology, and/or the like configured to detect targets/threats).

Figure 2B:
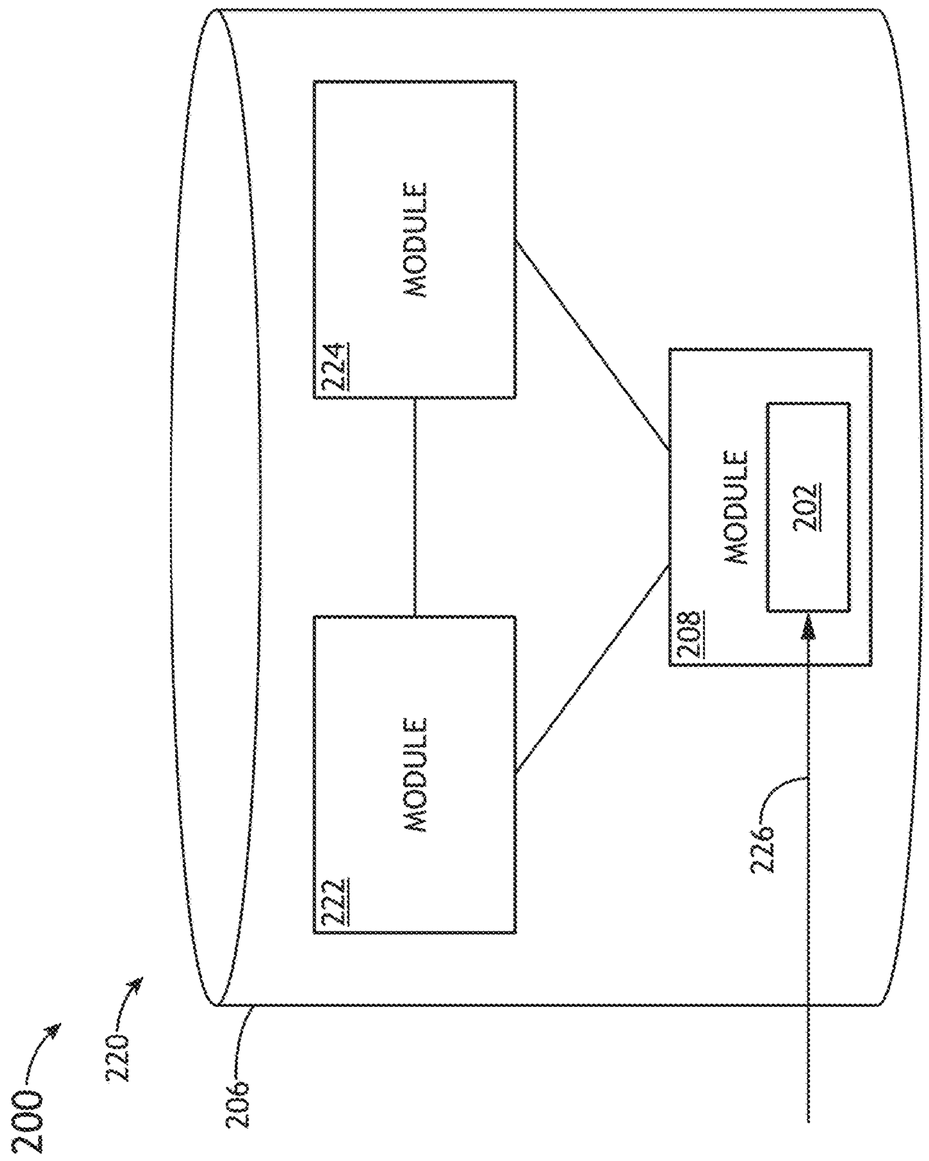
FIG. 2B is a conceptual illustration of a threat aggregator module including an airport threat module, in accordance with example embodiments of this disclosure.

For example, the controller 102 may be configured to receive the new data 202, such as shown by arrow 226 and module 208 in step 220 of FIG. 2B.

In embodiments, the sensor may be a radar sensor (e.g., X-band radar sensor, Ka-band radar sensor, and/or the like). In this regard, the new data 202 (and/or safe historical data 232) may be radar data.

In embodiments, the sensor may be a dual-use sensor configured to transmit a signal for purposes of both threat detection and weather detection.

FIG. 2B is a conceptual illustration of a threat aggregator module 206 including an airport threat module 208, in accordance with example embodiments of this disclosure.

In embodiments, the threat aggregator module 206 may comprise one or more modules. For example, at least one of an airport threat module 208, a weather threat module 222, or other threat modules 224. For instance, the airport threat module 208 may be configured to compare the new data 202 and safe historical data (see, e.g., safe historical data 232 of FIG. 2C). The comparison may be performed via a comparison module 234 (see FIG. 2C) of the airport threat module 208.

The weather threat module 222 may include data indicative of weather threats (e.g., temperatures indicative of formation of snow, weather radar data, estimated snow-fall accumulation, and the like) and/or be configured itself to generate such data. For instance, generating such data may include combining weather radar data from multiple nodes 204 to estimate current weather threats (e.g., snow, sleet, ice buildup, high winds, rain, and/or the like).

In embodiments, (see step 306 of FIG. 3) the new data 202 and safe historical data 232 are compared to identify a difference 238 between the new data 202 and the safe historical data 232.

In embodiments, the comparison module 234 may comprise utilizing a deep learning module 234 configured to identify the difference 238. The difference 238 may include one or more differences 238 indicative of a threat (e.g., obstacle, hazard, and the like). For example, method 200 may include training a deep learning module 234 configured to identify the difference 238 (e.g., via inputting, during a training step, labeled training data pairs of radar image pairs with the differences 238 properly labeled). For instance, during an inference (non-training) step, the new data 202 (and/or historical data 232) may be input into the deep learning module 234 to identify the difference 238 (e.g., the output of the deep learning module 234 may be a bounding box, image coordinates, heat map output image of areas with high likelihood of difference 238, and/or any other data indicative of an existence and/or location of one or more differences 238).

However, note that such an example is nonlimiting and non-deep-learning approaches may also be used alone and/or in combination with deep learning approaches. For example, an image analysis technique that filters out similarities may be used. For instance, a method may include: overlaying the data 202, 232; subtracting out similar values to generate a difference image; and filtering the difference image based on a cutoff threshold value to identify image areas with sufficient differences to be identified as "differences 238". Note that the difference image may utilize the filter to filter out noise (i.e., minor differences which are not threats and could just be negligible differences in the alignment of the data 202, 232 and/or small changes to the radar data).

In embodiments, the difference 238 is further based on the weather threat module 222. For example, the system 100 may be configured to look for differences 238 corresponding to hard-packed snow by looking for reflectivity values of the snow based on the weather threat module 222. For instance, the weather threat module 222 may input data into the comparison module 234 or the like such as data indicative of a high risk of snow accumulation, temperature data, precipitation risk data, and/or the like. In this regard, the system 100 may be configured to combine weather risk data with multiple aircraft radar data to identify differences in the radar data indicative of a threat (e.g., hard packed snow).

The system 100 may be configured to receive such weather data in a variety of ways such as, but not necessarily limited to, data from a publicly available database of current weather, temperature/radar sensors at an airport, and/or (as noted earlier) a dual-use radar sensor of an aircraft 204 configured to sense threats and weather.

In embodiments, the system 100 is configured to label the difference 238 as a particular type of threat, including at least one of: a static obstacle (e.g., debris on the runway), or snow (e.g., hard packed snow based on a radar reflectivity value of the snow).

In embodiments, the system 100 is configured to disregard differences comprising a reflectivity that is outside a threshold level of reflectivity. For example, the system 100 may be configured to disregard (e.g., filter out) differences comprising a reflectivity indicative of relative soft/safe snow by filtering out reflectivity in the new data 202 that is outside a threshold level (e.g., any value) of reflectivity. For instance, the system 100 be configured to account for seasonal differences and/or date ranges associated with the new data 202, such as accounting for whether the current season is winter (e.g., December 21 through March 20), spring, summer, or fall and considering this when comparing (e.g., when attempting to identify the differences 238). For example, the system 100 may be configured to identify differences 238 within a threshold range of values as frozen liquid (e.g., snow and/or ice) when the current season is winter.

Further, seasonal differences and/or date ranges may also be considered for deciding which safe historical data 232 to compare to. For example, the system 100 may be configured to compare safe historical data 232 of a particular season and/or data range to the same (or similar) season and/or data range as the new data 202. In this regard, similar data may be compared that considers seasonal differences, which may increase an accuracy of identifying threats 238.

Figure 2C:
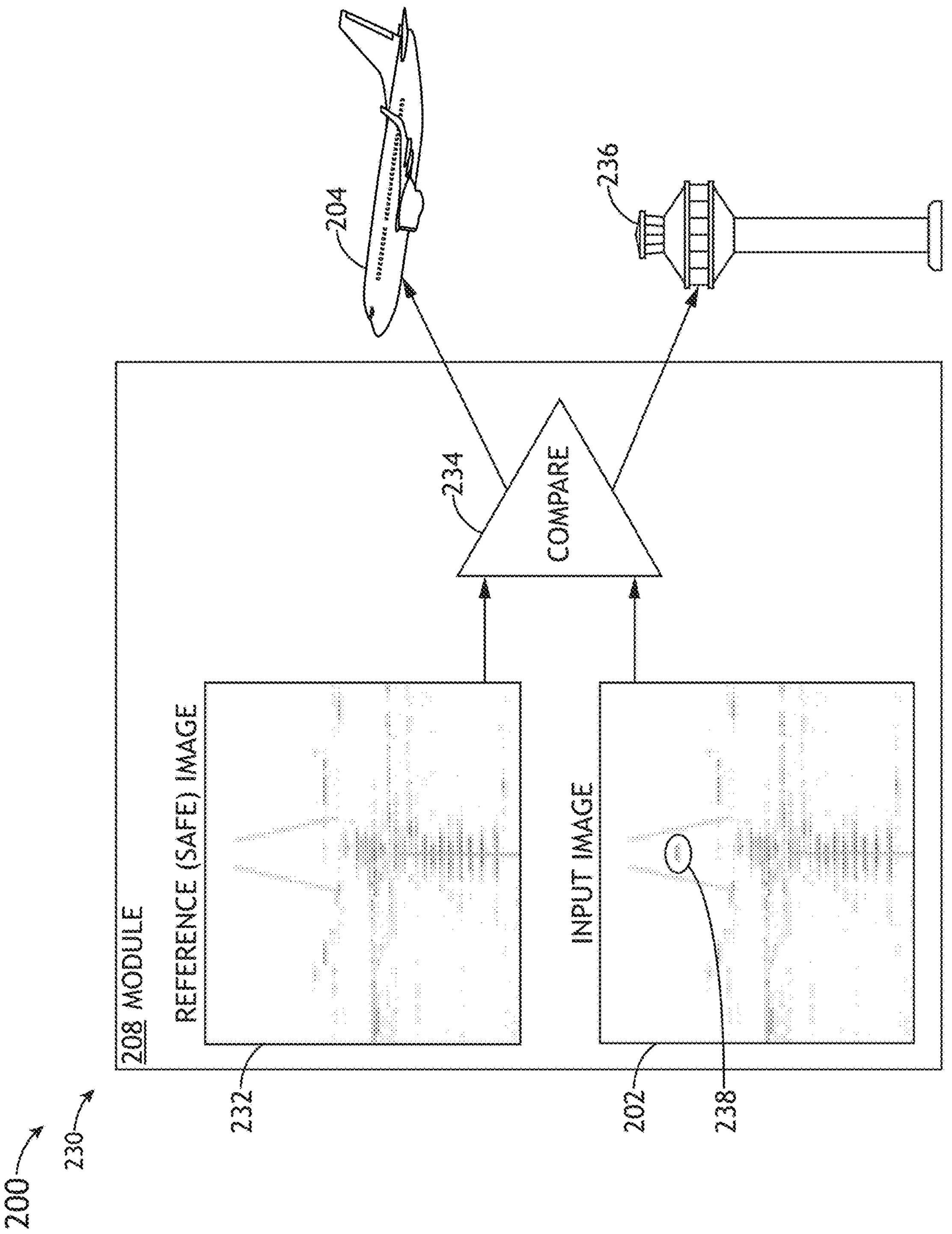
FIG. 2C is a conceptual illustration of a comparing step for generating differences indicative of threats, in accordance with example embodiments of this disclosure.

FIG. 2C is a conceptual illustration of a comparing step 230 for generating differences 238 indicative of threats, in accordance with example embodiments of this disclosure.

As noted above, the new data 202 and safe historical data 232 may be compared to identify a difference 238 between the new data 202 and the safe historical data 232.

In embodiments, the system 100 is configured to direct a transmission to be sent that is indicative of the difference 238. For example, the transmission may be sent via an ADS-B signal, a Wi-Fi® wireless networking technology upload to an aircraft node 204, a wired connection to a network database 236, and/or any other way to transmit data. In some examples, the transmission is configured to be sent to the one or more nodes 204 (e.g., so each aircraft obtains a more robust determination of differences/threats 238). In some examples, the transmission is configured to be sent to a future (different) set of nodes 204 (e.g., aircraft 204 that have yet to observe the threat 238 in any way but would benefit from awareness of the threat such as nodes 204 configured to potentially perform a landing on a runway including the threat 238). In some examples, the transmission is configured to be sent to an air traffic control threat database 236. For example, the air traffic control threat database 236 may be configured to be a centralized store of threats/differences 238. In embodiments, an air traffic control threat database 236 may be configured to transmit the threats/differences 238 as a Notice To AirMen (NOTAM) to nodes 204 within a cutoff range and/or who are configured to benefit from such knowledge. For example, the NOTAM may be indicative of an amount of ice buildup on a particular runway.

Figure 3:
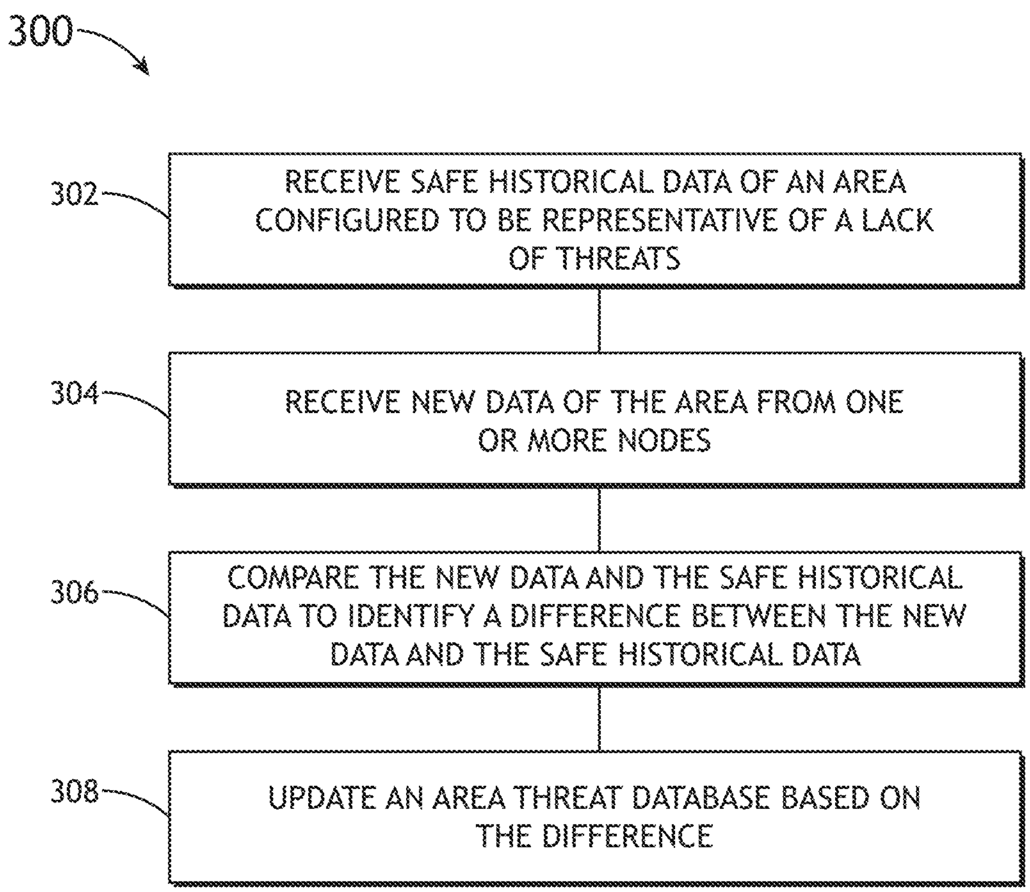
FIG. 3 is a flowchart illustrating a method for detecting threats at an area, in accordance with example embodiments of this disclosure.

FIG. 3 is a flowchart illustrating a method 300 for detecting threats at an area (e.g., airport), in accordance with example embodiments of this disclosure.

At step 302, safe historical data 232 is received of an area configured to be representative of a lack of threats (e.g., lack of differences 238). In embodiments, for example, radar data of the area that is confirmed to include no threats (e.g., no unidentified obstacles, no threats on the runway, and/or the like) may be captured using a similar and/or same sensor. For example, safe historical data 232 may be obtained during good weather conditions when confirmed (e.g., by ground personnel) that no obstacles are present. This data may, therefore, be indicative of "safe" conditions, insofar that at least the obstacles in such data are known and/or accounted for. For example, such data may include static non-runway obstacles (e.g., air traffic control towers, pylons, and the like) of little to no risk to aircraft. Then, when compared to new data 202 that includes a new threat, the new threat will stand out as a difference 238 more easily identified compared to the known obstacles in the safe historical data 232. In this regard, for example, threats may be more easily, quickly, unambiguously, and/or reliably identified.

At step 304, new data 202 of the area is received from one or more nodes 204. See, e.g., FIG. 2A. For instance, the set of program instructions may be configured to cause the controller 102 to receive the new data 202 of the area. The new data 202 may be from, for example, three or more nodes 204 at three or more time instances (e.g., time of day).

At step 306, the new data 202 and the safe historical data 232 are compared (e.g., via a comparison module 234) to identify a difference between the new data 202 and the safe historical data 232. Nonlimiting examples described above include deep learning and/or filtering images.

At step 308, an area threat database 120 is updated based on the difference 238. For example, the difference 238 may be configured to be appended/added to a database of threats via any method known in the art (e.g., stored on own memory 104, appended to the end of a table/list stored on centralized distributed memory, passed to an Application Programming Interface (API) of a cloud platform using stateless software communication protocols, written to a query-able database using server modules, and/or the like).

In an optional step, the system 100 (e.g., controller 102) may be configured to autonomously determine a path of the one or more nodes 204 to avoid a collision with an obstacle associated with the difference 238. For example, the path may be a taxi path (e.g., wheel-on-ground driving of an aircraft) and/or a flight path (e.g., takeoff/landing approach path). For instance, autonomous driving software (e.g., configured to actually drive autonomously without human input) and/or autonomous path suggestion software (e.g., configured to automatically provide a suggested path to a user/pilot) may be configured to generate a path that avoids the threat 238 (e.g., goes around it, uses a different route, and the like). In this regard, the system 100 may assist in reducing the risk of collisions in a way that is autonomous, which may reduce a mental load and/or increase efficiency of airport operations.

In embodiments, any amount of data may be used to improve detection of the threats/differences 238. For example, data comprising Automatic Dependent Surveillance-Broadcast (ADS-B) and/or Traffic Alert and Collision Avoidance System (TCAS) data may be utilized to correlate threats 238 that are identified in the area with previously identified threats (e.g., via methods herein) to improve a confidence of such detections of threats 238. For example, ADS-B data may be based on a lower resolution data (e.g., language descriptions of threats, coordinates, and/or the like) and may be improved by combining it (e.g., via the comparison module 234) with higher resolution data (e.g., radar sensor data as shown in FIG. 2C) of the same area for improved detection of a difference 238 in the area.

In embodiments, the system 100 is configured to receive air traffic control (ATC) data on what the aircraft traffic flow should be and use this in the comparison 234 and/or in the training of the deep learning module. For example, the ATC data may be used to filter out non-threats from a difference image if such non-threats are correlated to a signature of a safe/expected environment. For instance, the ATC data may include images of aircraft in adjacent runways that are in various positions. The deep learning model may be trained by a reward model and/or loss model configured to ignore such aircraft in that general area in a generalized manner.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments," "one embodiment," or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for detecting threats at an area, the system comprising:

one or more nodes comprising:

one or more sensors configured to detect the threats, wherein each sensor is configured to transmit new data of the area to a controller, wherein the new data comprises radar data, wherein the area comprises a runway, wherein the one or more sensors comprise at least one dual-use sensor configured to transmit a signal for purposes of both threat detection and weather detection, wherein the weather detection comprises detecting current weather threats comprising: sleet, ice buildup, winds, and rain; and the controller comprising one or more processors configured to execute a set of program instructions stored in a memory, the set of program instructions configured to cause the one or more processors to:

receive safe historical data of the area configured to be representative of a lack of the threats, wherein the safe historical data comprises radar data;

receive the new data of the area from the one or more nodes;

compare the new data and the safe historical data to identify a difference between the new data and the safe historical data;

label the difference as a particular type of threat including at least one of: a static obstacle, or snow;

receive additional data comprising at least one of: Automatic Dependent Surveillance-Broadcast (ADS-B) data or Traffic Alert and Collision Avoidance System (TCAS) data, wherein the additional data comprises threats identified in the area, wherein a resolution of the radar data of the new data is higher than a resolution of the additional data;

receive air traffic control (ATC) data, wherein the air traffic control data comprises data on the aircraft traffic flow for the area and images of aircraft in adjacent runways;

correlate the threat associated with the difference with the threats identified in the area of the additional data and the air traffic control data to improve a confidence of the threat associated with the difference;

update an area threat database based on the difference;

autonomously determine a path of the one or more nodes; and avoid a collision with the threat associated with the difference using the path.

2. The system of claim 1, wherein the comparing is performed via an airport threat module of a threat aggregator module, wherein the threat aggregator module further comprises a weather threat module.

3. The system of claim 2, wherein the comparing is further based on the weather threat module.

4. The system of claim 3, wherein the system is configured to disregard differences comprising a reflectivity that is outside a threshold level of reflectivity.

5. The system of claim 4, wherein the comparing is further configured to consider a particular season and/or date range associated with the new data.

6. The system of claim 1, wherein the new data comprises data from three or more aircraft at three or more time instances.

7. The system of claim 1, wherein the comparing comprises utilizing a deep learning module configured to identify the difference.

8. The system of claim 1, wherein the system is further configured to direct a transmission to be sent that is indicative of the difference, wherein the transmission is configured to be sent to at least one of:

the one or more nodes;

a future set of nodes; or an air traffic control threat database.

9. A method for detecting threats at an area, the method comprising:

receiving, using a controller, safe historical data of the area configured to be representative of a lack of the threats, wherein the safe historical data comprises radar data, wherein the area comprises a runway;

receiving, using the controller, new data of the area from one or more nodes, wherein the one or more nodes comprise: one or more sensors configured to detect the threats, wherein each sensor transmits the new data of the area to the controller, wherein the new data comprises radar data, wherein the one or more sensors comprise at least one dual-use sensor configured to transmit a signal for purposes of both threat detection and weather detection, wherein the weather detection comprises detecting current weather threats comprising: sleet, ice buildup, winds, and rain;

comparing, using the controller, the new data and the safe historical data to identify a difference between the new data and the safe historical data;

label, using the controller, the difference as a particular type of threat including at least one of: a static obstacle, or snow;

receiving additional data comprising at least one of: Automatic Dependent Surveillance-Broadcast (ADS-B) data or Traffic Alert and Collision Avoidance System (TCAS) data, wherein the additional data comprises threats identified in the area, wherein a resolution of the radar data of the new data is higher than a resolution of the additional data;

receiving air traffic control (ATC) data, wherein the air traffic control data comprises data on the aircraft traffic flow for the area and images of aircraft in adjacent runways;

correlating the threat associated with the difference with the threats identified in the area of the additional data and the air traffic control data to improve a confidence of the threat associated with the difference;

updating an area threat database based on the difference;

autonomously determine a path of the one or more nodes; and avoid a collision with the threat associated with the difference using the path.

10. The method of claim 9, wherein the comparing is performed via an airport threat module of a threat aggregator module, wherein the threat aggregator module further comprises a weather threat module.

11. The method of claim 10, wherein the comparing is further based on the weather threat module.

12. The method of claim 11, further comprising disregarding differences comprising a reflectivity that is outside a threshold level of reflectivity.

13. The method of claim 9, wherein the comparing comprises utilizing a deep learning module configured to identify the difference.

* * * * *